(12) United States Patent
Palmieri

(10) Patent No.: US 8,176,411 B2
(45) Date of Patent: May 8, 2012

(54) INTEGRATING AN APPLET INTO A MULTI-PAGE OR MULTI-TASKING WEB APPLICATION TO ENABLE APPLET STATE TO BE AUTOMATICALLY SAVED AND RESTORED

(75) Inventor: David W. Palmieri, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/174,464

(22) Filed: Jul. 16, 2008

(65) Prior Publication Data
US 2010/0017695 A1    Jan. 21, 2010

(51) Int. Cl.
*G06F 17/00* (2006.01)
*G06F 9/44* (2006.01)

(52) U.S. Cl. ........ 715/205; 715/234; 715/738; 715/851; 717/111; 717/115

(58) Field of Classification Search .......... 715/200–206, 715/209, 229, 231, 234, 240, 243, 250, 252, 715/253, 254–256, 273, 700, 731, 737, 715, 715/738, 746, 749, 760, 762, 825, 854; 717/100, 717/106, 107, 108, 111, 115, 128, 167, 173
See application file for complete search history.

(56) References Cited

U.S. PATENT DOCUMENTS

| | | | |
|---|---|---|---|
| 6,205,476 B1* | 3/2001 | Hayes, Jr. ..................... | 709/220 |
| 6,212,564 B1* | 4/2001 | Harter et al. ................. | 709/228 |
| 6,473,894 B1* | 10/2002 | Shrader et al. ................ | 717/126 |
| 6,532,023 B1* | 3/2003 | Schumacher et al. ........ | 715/704 |
| 6,633,316 B1* | 10/2003 | Maddalozzo et al. ........ | 715/854 |
| 6,638,315 B2* | 10/2003 | Uppiano et al. .............. | 715/237 |
| 6,934,734 B2* | 8/2005 | Lakhdhir ...................... | 709/202 |
| 7,209,960 B2* | 4/2007 | Veselov ........................ | 709/219 |
| 7,216,300 B2* | 5/2007 | Dang ............................ | 715/783 |
| 7,234,107 B1* | 6/2007 | Aoki et al. .................... | 715/207 |
| 2002/0069266 A1* | 6/2002 | Lakhdhir ...................... | 709/219 |
| 2002/0174108 A1* | 11/2002 | Cotner et al. .................... | 707/3 |
| 2006/0031479 A1* | 2/2006 | Rode ............................ | 709/224 |

OTHER PUBLICATIONS

Zukowski, J., "How Can I Save Applet State?", jGuru, Jun. 30, 2005.
"Applet Persistence API", Java Sun Developer Guide, viewed Jan. 16, 2008.

* cited by examiner

*Primary Examiner* — Maikhanh Nguyen
(74) *Attorney, Agent, or Firm* — Patents on Demand P.A.; Brian K. Buchheit; Scott M. Garrett

(57) ABSTRACT

A Web page of a Web application can be identified. The identified Web page can include an applet. A navigation action from the identified Web page to another Web page of the multi-page Web application can be detected. A state of the applet can be automatically saved before the applet terminates and the next Web page is navigated to. A navigation action to return to the identified Web page can be detected. This navigation can cause the previously saved applet state to be automatically retrieved and applied to the identified Web page so that the Web page is presented in a state that it was in when last navigated away from.

10 Claims, 2 Drawing Sheets

INTEGRATING AN APPLET INTO A MULTI-PAGE OR MULTI-TASKING WEB APPLICATION TO ENABLE APPLET STATE TO BE AUTOMATICALLY SAVED AND RESTORED

BACKGROUND OF THE INVENTION

The present invention relates to the field of dynamic content processing and, more particularly, to integrating an applet into a multi-page or multi-tasking Web application to enable applet state to be automatically saved and restored.

Many Web applications utilize multiple pages and/or implement multi-tasking technologies. At present, dynamic information (e.g., applet information) is lost when a user switches from one page to another within the Web application. That is, when a Web page contains an applet, and when a user accesses another Web page, the applet is terminated. Sometimes, this new page is a different page of the same Web application. For example, the other page can be associated with a different tab in a tabbed notebook, can be a different step in a Wizard, or can be another task in a Web application (i.e., for a Web application that allows the user to have more than one task active at the same time). When a user returns to the original page containing the applet, the applet is restarted. Since the user did not explicitly finish the operation, the applet restarts as if the user is accessing the Web page for the first time. All applet state information is lost. This assumes a finalization condition (e.g., a natural savepoint based upon processing logic such as form completion or an explicit user save using an applet or Web control) has not occurred.

For example, a user can utilize a check-out wizard of an e-commerce site. The user can enter personal information in an initial page needed for checking out, when the user realizes he/she wants to add another item to the shopping cart. The user can click on a back navigation button or a home button from the Web site to select an additional item to add to a shopping cart. When the user returns to the check-out wizard, the personal information they previously entered is lost (i.e., an applet for check-out is terminated when navigating back to an original page and restarted when the user returns to the check-out page). The user must then reenter this information to proceed, which can annoy the user, sometimes enough that he/she exits the Web site without purchasing the items. No known solution exists for this problem.

BRIEF SUMMARY OF THE INVENTION

One aspect of the present invention can include a method, apparatus, computer program product, and system for automatically saving and restoring state data using an integrated applet. In this aspect, a Web page of a multi-page or multi-tasking Web application can be identified. The identified Web page can include an applet. A navigation action from the identified Web page to another Web page of the multi-page Web application can be detected. A state of the applet can be saved. A navigation action to return to the identified Web page from a different Web page of the Web application can be subsequently detected. The saved state can be retrieved and applied to the identified Web page so that the applet is presented in a state existent immediately before the navigation action.

Another aspect of the present invention can include a method, apparatus, computer program product, and system for retaining state of applets. In this aspect, a user interaction to navigate from a Web page containing an applet to a different Web page can be received. The Web page and the different Web page can be pages of a same Web application. An event can be fired responsive to the received user interaction, where the event causes the applet to be terminated, and causes the different Web page to be provided to replace the Web page. Before being terminated, state data for the applet can be automatically saved. In a subsequent interaction, the Web page containing the applet having saved state information can be re-initiated, which can occur in a same interactive Web session with the Web application. The state data can be retrieved and applied when rendering the Web page. Thus, the Web page is restored to a state that Web page was in (e.g., the applet is restored to a pre-navigation state) when the navigation to the different Web page occurred.

Still another aspect of the present invention can include a system for a multi-page Web application that includes an applet, a savepoint repository (e.g., any storage medium), state saving code, and state restoring code. The Web application can include multiple Web pages. At least one of the Web pages can include an applet configured to execute within a client when the Web page is utilized. The savepoint repository can maintain a set of savepoints. At least one of the savepoints can be an application savepoint for the applet. The state saving code can save a state of the applet in the savepoint repository. This saving of an applet state can occur automatically when an attempt to navigate away from a Web page containing an applet is made. The state restoring code can restore a state of the applet using a savepoint stored in the savepoint repository. The restoring of the applet state can occur automatically when a user navigates back to a Web page containing an applet with a previously saved state (to restore the applet to the state the applet was in when the page was navigated away from).

DETAILED DESCRIPTION OF THE INVENTION

Figure 1:
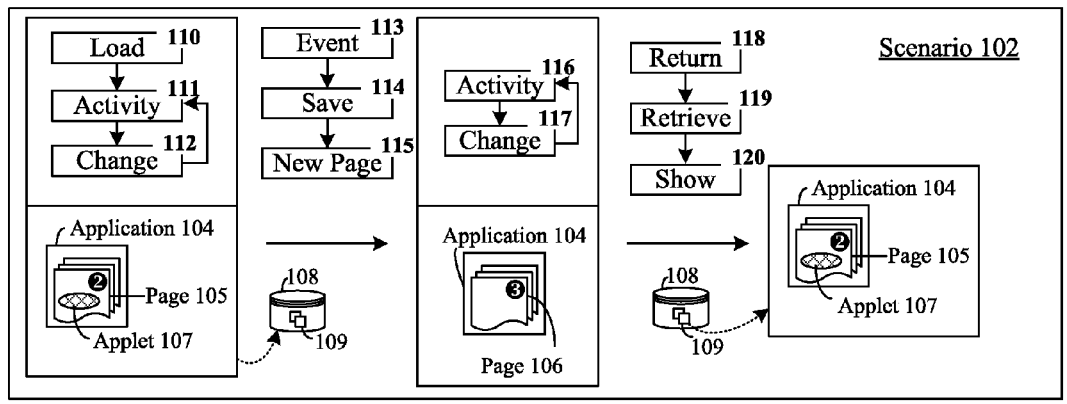
FIG. 1 is a schematic diagram illustrating a scenario and a system for automatically saving and restoring applet state responsive to navigation actions in accordance with an embodiment of the inventive arrangements disclosed herein.
Figure 1:
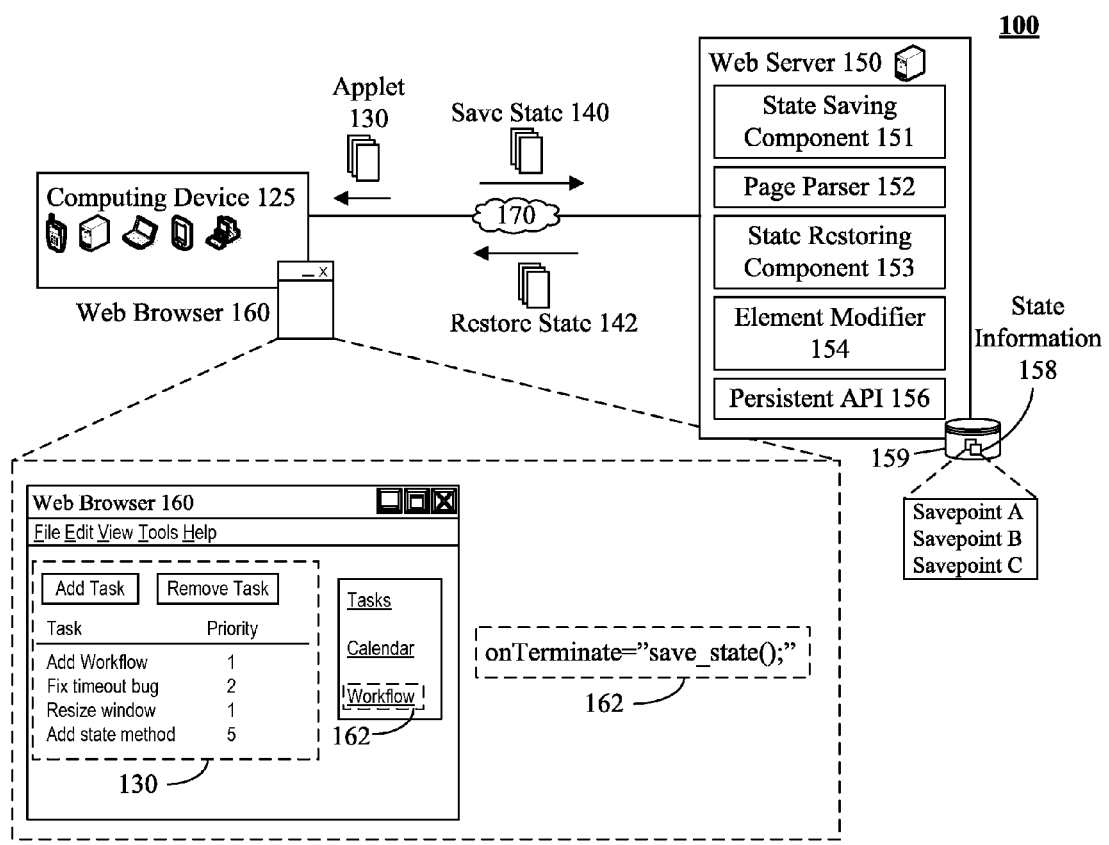

The present invention discloses a solution for automatically saving and restoring applet state within a multi-page or multi-tasking Web application. In the solution, applet changes made by a user in a session, can be stored and retrieved when a user action is invoked that would normally result in data loss. For example, whenever an event fires to terminate dynamically generated Web content (e.g., content resulting from an applet execution) during a session, state information and/or any data entered into a dynamically generated Web page can be saved. When stored, this information can be indexed against a unique identifier for that dynamic code (e.g., applet_id) for that session. User actions that cause dynamically generated Web content to be discarded (e.g., cause an applet to terminate) can include, clicking hyperlinks, interacting with hypertext markup language (HTML) form elements, using browser navigation buttons, and the like. During the same Web session, another user interaction can be detected that causes the applet to return to re-generate the dynamic Web content (e.g., cause the applet to re-execute). At this point, the previously saved state information and/or data can be retrieved and reapplied. Thus, from a user perspective the dynamically generated Web content presented within a browser is the same as when last referenced. No explicit user save/restore action or Web page completion event is needed for the saving/restoring to occur.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a scenario 102 and a system 100 for automatically saving and restoring applet state responsive to navigation actions in accordance with an embodiment of the inventive arrangements disclosed herein.

In scenario 102, a Web application 104 can be a multi-page (including at least pages 105-106). Alternatively, the Web application 104 can be a multi-tasking application (not shown). At least one application page 105 can contain an applet 107. The page 105 containing the applet 107 can be loaded 1 10. A user can then conduct any number of interactive activities 111 involving the page 105. Some of these activities 111 can change 112 applet 107 state information. An event 113 can be initiated, which causes the page 105 and the applet 107 to terminate. When this occurs, applet 107 data can be saved 114 in data store 108 as a savepoint 109. The data store 108 can represent any storage medium, which includes volatile memory and/or non-volatile memory. A new page 106 of the application 106 can be loaded 115 responsive to the event 1 13. User activities 116 with the application 104 can result in any number of changes 117 to the page content 106 and/or to pages of the application 104 unrelated to page 105.

At one point, a user can perform an action to return 118 to the page 105 that contains applet 107. At this point, savepoint 109 information for the applet 107 can be retrieved 119 from data store 108. Page 105 can be shown 120 and the applet 107 can be restored to the state it was in when the save 114 occurred. It should be noted that a single Web page 105 can include any number of applets 107 for which applet state information is automatically saved and restored.

System 100 shows one embodiment for implementing scenario 105. In this embodiment, the save and restore actions are largely executed within a server (e.g., Web server 150) even though the applet 130 for which state is saved/restored is a client-side application executing within computing device 125. Other embodiments of the invention exist. For example, the detection, creation, saving, and retrieving of state for applet 130 can be a client side process being performed entirely by device 125 and code residing in device 125. In such an embodiment, functionality of the state saving component 151 and the state restoring component 153 can be implemented in software of device 125. Additionally, system 100 shows an example specific to a JAVA implementation, where APPLETS, SERVLETS and the like are mentioned. A JAVA implementation is not a limit of the scope of the invention, however, which can be implemented for other languages and standards to similar effect. JAVA specific artifacts were selected as it is a popular and well defined language useful for expressing the concepts of the inventive arrangements described herein.

In system 100, a computing device 125 can include a Web browser 160 through which a user interacts with multi-page/multi-tasking Web application containing at least one applet 130, which is served by server 150 over network 170. System 100 can handle an unbounded number of applets 130 (provided there are sufficient resources—memory, storage, etc.) to handle the applets 130. Each applet 130 can generate dynamic content, which is subject to change during user interactions. A number of interface options 162 can exist for navigating to other portions or pages of the multi-page/multi-tasking Web application. When this occurs, a current displayed page is replaced with a new page, and the applet 130 of the current Web page terminates. This termination event 162 can be detected, which can trigger the state saving component 151 to execute. This component 151 can automatically save the applet state data 140 before the applet 130 is terminated as a savepoint 158 of a savepoint repository 159. In one embodiment, a page parser 152 can be utilized to determine a present state of the applet 130 and to identify content provided within a dynamically generated page, to extract this content, and to store it within the appropriate savepoint.

In one embodiment, the parser 152 can parse the Web page before it is sent over the network 170 and rendered in the browser 160. During the parsing, the parser 152 can look for elements of the Web page that would cause the page to terminate. For example, the parser 152 can look for buttons and hyperlinks that when clicked would cause the user to navigate to another page in the Web application, thereby terminating the page containing the applet 130. When the parser 152 finds such an element, the parser 152 can modify the element to save the applet state before the element causes the Web page to be terminated. For example, if the element is a button, the parser 152 can add "on click" logic to save the applet state prior to performing the navigation.

Further browser 160 interactions can occur with subsequent pages, which can be pages of the same application (e.g., a multi-page Web application) accessed during the same interactive session. These other Web pages can also have associated applets 130 and savepoints can be created to store state information for these applets 130 as navigation actions among pages occur. At one point, a user of browser 160 can again perform a navigation action, which causes the Web page associated with applet 130 having a previously saved state to be presented in the browser. At this point, a state restoring component 153 can execute, which determines a savepoint associated with the page to be rendered, retrieves the savepoint data, and applies it to the page being rendered.

In one embodiment, applet 130 can be an applet originally lacking intra-session save and restore capabilities. Utilizing components 152-156, applet 130 behavior can be modified to maintain user made changes within a session. As previously mentioned, for example, page parser 152 can be utilized to identify and determine page and HTML elements that can result in applets 130 either initiating or terminating, where applet 130 information should be saved and/or retrieved. Page and HTML elements causing page reloads, page changes, new windows to be opened, and the like, can be identified as elements to be modified. For example, page parser 152 can utilize regular expressions to identify hyperlinks on the page that need to be modified.

When an HTML element has been identified, element modifier 154 can be used to alter the function of the element to allow a save state functionality to be invoked. For example, a hyperlink 162 can be modified to include an "onClick=save_state( )" JAVASCRIPT event handler which can invoke a JAVA applet method able to save the current applet state. Further, element modifier 154 can be used to modify interactive element properties allowing a save 140 state action to be executed before an action is performed. In one embodiment, save 140 actions can be performed through the invocation of persistent API function calls. The API 156 can include but is not limited to JAVA, JAVASCRIPT, C, C++, client side scripting, and the like. Alternatively, API 156 can be intermediary software facilitating save/restore functionality locally and/or remotely.

As used herein, state information saved 140 to repository 159 and restored 142 when a page is reloaded can include one or more savepoints. The state information can include, user entered data, session specific changes, applet 130 configuration settings, and the like. Multiple savepoints in state information 158 can be used to track multiple states of a single application, multiple applications, one or more users, multiple application sessions, and the like. In one embodiment, each savepoint can be identified by an applet_id, which is a unique identifier for a given user interactive session with an associated applet.

Computing device 125 can include any device through which a browser 160 is able to be interactively presented and upon which an applet 130 (or other interactive code) can execute. The presentation of browser 160 of device 125 is not limited to a graphical user interface (GUI) configuration, but can also include voice user interface (VUI) browsers, text based browsers, and the like. In various implementations, device 125 can be a personal computer, a notebook computer, a personal data assistant (PDA), a mobile phone, a thin client, a kiosk, and the like.

Web server 150 can be a software/hardware component capable of accepting and responding to hypertext transport protocol (HTTP) requests. In one embodiment, server 150 can facilitate save state 140 and restore state 142 actions for applet 130. Web server 150 can serve Web pages, which include one or more applets 130. In one embodiment, code for the state saving component 151 and the state restoring component 153 can be implemented as SERVLETS, which execute upon server 150 or another network server linked to server 150. The Web server 150 can be implemented as a single computing device, as a pool or cluster of servers, of a set of distributed components that together perform server functions, and the like.

Figure 2:
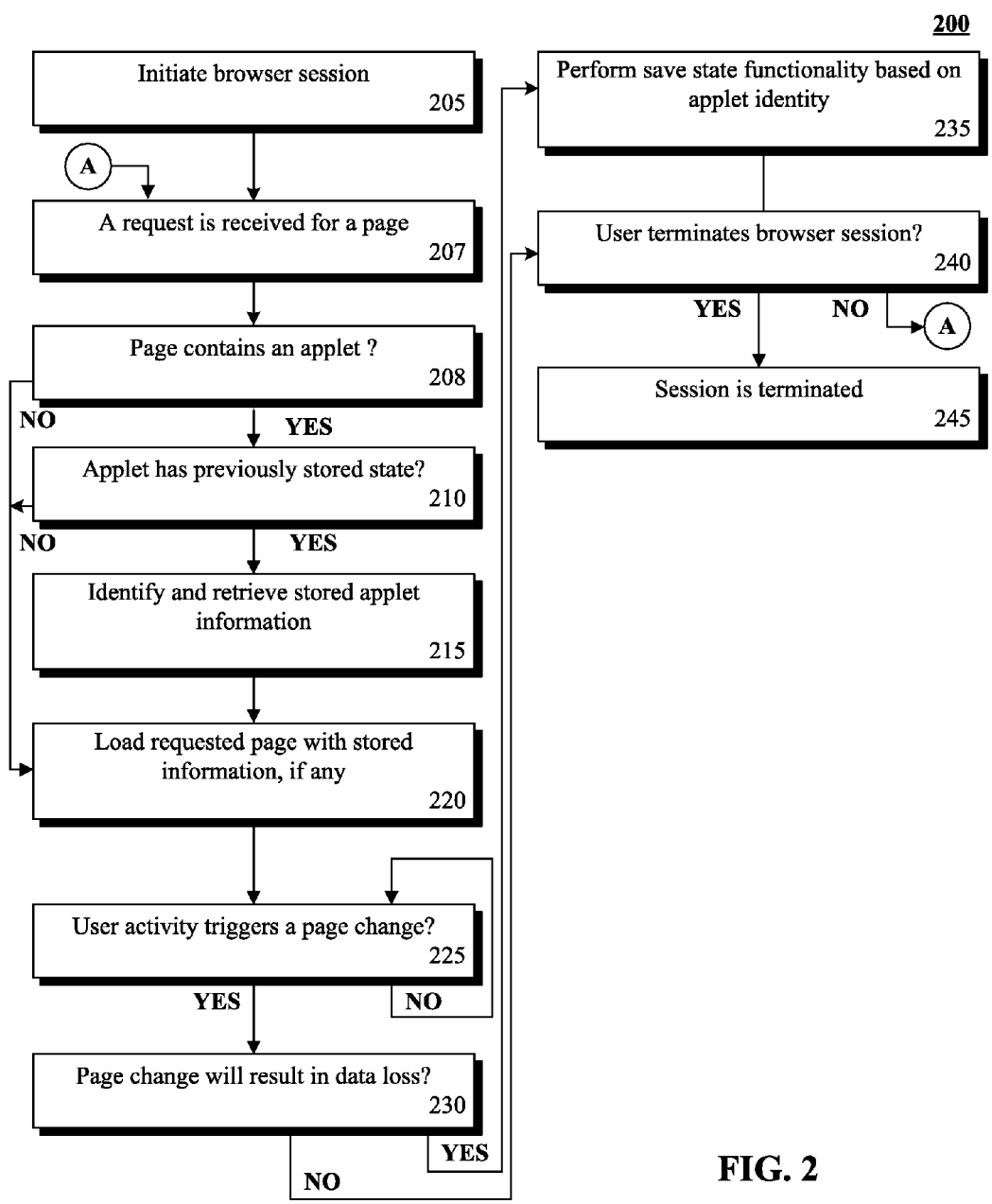
FIG. 2 is a flowchart of a method for maintaining applet persistence throughout a user session in accordance with an embodiment of the inventive arrangements disclosed herein.

FIG. 2 is a flowchart of a method 200 for automatically maintaining applet state throughout a user session in accordance with an embodiment of the inventive arrangements disclosed herein. Method 200 can be performed in the context of system 100. In method 200, a user can interact with a multi-page or multi-tasking Web application capable of saving and restoring application state information. As used herein, state information can include but is not limited to, user entered data, session specific changes, configuration settings, and the like.

In step 205, a browser session can be initiated. In step 207, a request can be made for a Web page, which can be a page of a multi-page and/or a multi-tasking Web application. In step 208, a check can be made for whether the requested page contains an applet. If not, the method 200 can progress directly to step 220, where the requested page is loaded. If so, step 210 can execute, where a check for a previously stored applet state can be performed. If no previously stored state exists, step 220 can execute, else step 215. In step 215, the applet can be identified and stored state information associated with the applet can be retrieved and used to restore the applet to a previous state. In step 220, the requested Web page can be loaded. If step 215 has executed (page has an applet with a previously saved state), the page can be presented with the applet having the restored state information.

In step 225, a user can interact with the Web page. Interactions can continue so long as a user does not trigger a page change. One such user activity can include a navigation operation from one page (e.g., a page containing an applet) to another page. When a page change is triggered, the method can proceed to step 230

In step 230, if the Web page or task change will result in data loss, the method can continue to step 235, else continue to step 240. In step 235, based on the applet identity, state information associated with the applet can be saved. State information can be stored and retrieved locally and/or remotely of the executing applet.

In step 240, if the user terminates the browser session, the method can continue to step 245, else the method can return to step 207. In step 245, the browser session is terminated and applet data can be optionally stored for use in later sessions. Applet state information can be discarded in embodiments where this state information is not to be reused in the next session.

In one embodiment, a Web page containing the applet can be parsed to determine elements containing navigation actions and/or other actions that cause an applet to be terminated or initiated. Programmatic logic associated with these elements can be changed to ensure that applet state is saved prior to terminating an applet and to ensure application state is restored prior to initiating an applet. Thus, server side actions can be taken that cause client-side executed code (code resulting from the server performed changes in logic associated with Web page elements) to save/restore applet state.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for saving and restoring state data comprising:
   identifying a Web page of at least one of a multi-page and a multi-tasking application, wherein said identified Web page contains an applet;
   dynamically modifying Web page code of the Web page to include logic to automatically save applet state before the applet terminates;
   detecting a navigation action from the identified Web page to another Web page;
   automatically saving a state of the applet, wherein the navigation action triggers an event that causes the applet of the Web page to terminate, wherein the saving of the state of the applet is responsive to the event detection by executing the logic as modified;

navigating to the another Web page responsive to the navigation action;

navigating back to the identified Web page;

automatically retrieving the saved state of the applet; and automatically applying the retrieved state to the identified Web page, wherein saving the state and restoring the state occur without a user explicitly selecting Web interface controls specific to saving and restoring data and without activities associated with the applet being fully completed before the navigation action is detected.

2. The method of claim 1, further comprising:

determining elements of the application containing the identified Web page that if selected cause the applet to terminate before serving a different Web page to a client;

modifying programmatic logic of each determined element of the identified Web page to cause a saving of the applet state before the applet terminates; and serving the Web page to the client, wherein the identified navigation action is an action triggering the modified programmatic logic.

3. The method of claim 1, wherein the automatic saving and restoring of applet state is performed by a combination of programmatic logic in a SERVLET and in the applet.

4. The method of claim 1, further comprising:

detecting a navigation action to navigate away from the another Web page, wherein the another Web page contains another applet;

automatically saving a state of the another applet; and navigating from the another Web page after saving the state of the another applet.

5. The method of claim 4, further comprising:

navigating to the another Web page after having navigated from the another Web page;

automatically retrieving the saved state of the another applet; and automatically applying the retrieved state to the another Web page.

6. The method of claim 1, further comprising:

performing an arbitrary number of navigation actions not related to the identified Web page after navigating to the another Web page and before navigating to the identified Web page, wherein the arbitrary number of navigation actions comprise at least one navigation action to a Web page other than the another Web page and other than the identified Web page.

7. The method of claim 1, wherein the identified Web page contains a plurality of applets, wherein said plurality contains said applet, wherein said automatic saving saves the state of the plurality of applets, wherein the automatic retrieving retrieves the saved state of the plurality of applets, wherein the automatic applying applies the retrieved state to each of the plurality of applets of the identified Web page.

8. The method of claim 1, further comprising:

determining a request for the Web page, when navigating back to the Web page, wherein the applying of the save data occurs when rendering the Web page responsive to the request.

9. The method of claim 8, wherein thee Web page is a page of a multi-page Web application, wherein the saving and the retrieving of the sate data occur within a single interactive session with the multi-page Web application, and wherein the Web page contains a plurality of applets, wherein the logic is configured to automatically save applet state of each of the plurality of applets before terminating instances of the applets, and wherein the retrieving and applying of the applet state data applies to each of the plurality of applets of the Web page.

10. The method of claim 1, wherein said method is performed by a system for automatically having and restoring applet state, wherein said saving of the state of the applet saves the state information in a savepoint repository configured to maintain a plurality of savepoints, wherein at least a portion of said savepoints comprise at least one application savepoint for the application.

* * * * *